United States Patent [19]
Shima

[11] Patent Number: 6,149,323
[45] Date of Patent: *Nov. 21, 2000

[54] PRINT SYSTEM, PRINTER CONTROLLER, PRINTER, AND PRINTER CONTROL METHOD

[75] Inventor: Toshihiro Shima, Nagano, Japan

[73] Assignee: Seiko Epson Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/047,433

[22] Filed: Mar. 25, 1998

[30] Foreign Application Priority Data

Mar. 25, 1997 [JP] Japan ................................ 9-072105
Jan. 30, 1998 [JP] Japan ................................ 10-018658

[51] Int. Cl.⁷ .................................................. B41J 11/44
[52] U.S. Cl. ........................... 400/76; 400/70; 400/61
[58] Field of Search ................................ 400/76, 61, 70

[56] References Cited

U.S. PATENT DOCUMENTS

| 5,345,548 | 9/1994 | Nomura et al. | 395/150 |
|---|---|---|---|
| 5,623,675 | 4/1997 | Mizuki | 395/733 |
| 5,625,757 | 4/1997 | Kageyama et al. | 395/113 |
| 5,666,478 | 9/1997 | Nishikawa | 345/458 |
| 5,678,000 | 10/1997 | Ohtani | 395/102 |
| 5,872,900 | 2/1999 | Tsuchitoi | 395/111 |
| 5,887,990 | 3/1999 | Card et al. | 400/61 |

FOREIGN PATENT DOCUMENTS

| 0 780 787 | 6/1997 | European Pat. Off. . |
|---|---|---|
| 63-288321 | 11/1988 | Japan . |
| 8-69361 | 3/1996 | Japan . |
| 8-320769 | 12/1996 | Japan . |
| 3-61562 | 3/1997 | Japan . |

Primary Examiner—John S. Hilten
Assistant Examiner—Charles H. Nolan, Jr.
Attorney, Agent, or Firm—Sughrue, Mion, Zinn, Macpeak & Seas, PLLC

[57] ABSTRACT

A print system is disclosed which comprises a printer; a setting device for receiving a setting value specifying a print mode which is entered by a user; a storage device for storing the setting value determined by the setting device; a selector for selecting the setting value selected by the user from the existing setting values stored in the storage device; and a printer controller which processes a document through use of the setting value selected or newly entered by the user to thereby produce print data and which supplies the produced print data to the printer.

29 Claims, 6 Drawing Sheets

PRINT SYSTEM, PRINTER CONTROLLER, PRINTER, AND PRINTER CONTROL METHOD

BACKGROUND OF THE INVENTION

1. Field of the Invention

The present invention relates to a print system comprising a host computer and a printer connected to the computer, and more particularly, to improvements in the technique of specifying a print mode with respect to a printer at the time of printing of a document.

2. Description of the Related Art

In this type of print system, an application program installed in the host computer prepares a document, and a printer driver constituting a part of an operating system is initiated to print the document. In response to user instructions, the printer driver determines setting values which specify a print mode (e.g., paper orientation, paper size, type of paper, resolution, a color/monochrome printing mode, a color conversion table, half-toning operations such as error diffusion filtering or dither filtering, print density, a dot gain, a color balance, lightness, chroma, or the like). Subsequently, the printer driver converts the document prepared by the application program into a data format capable of being printed by a printer according to the setting values, sending the thus-converted data to the printer.

In a conventional system, the setting values determined by the printer driver are stored in the host computer as a part of each document data set together with the document data set.

Figure 1:
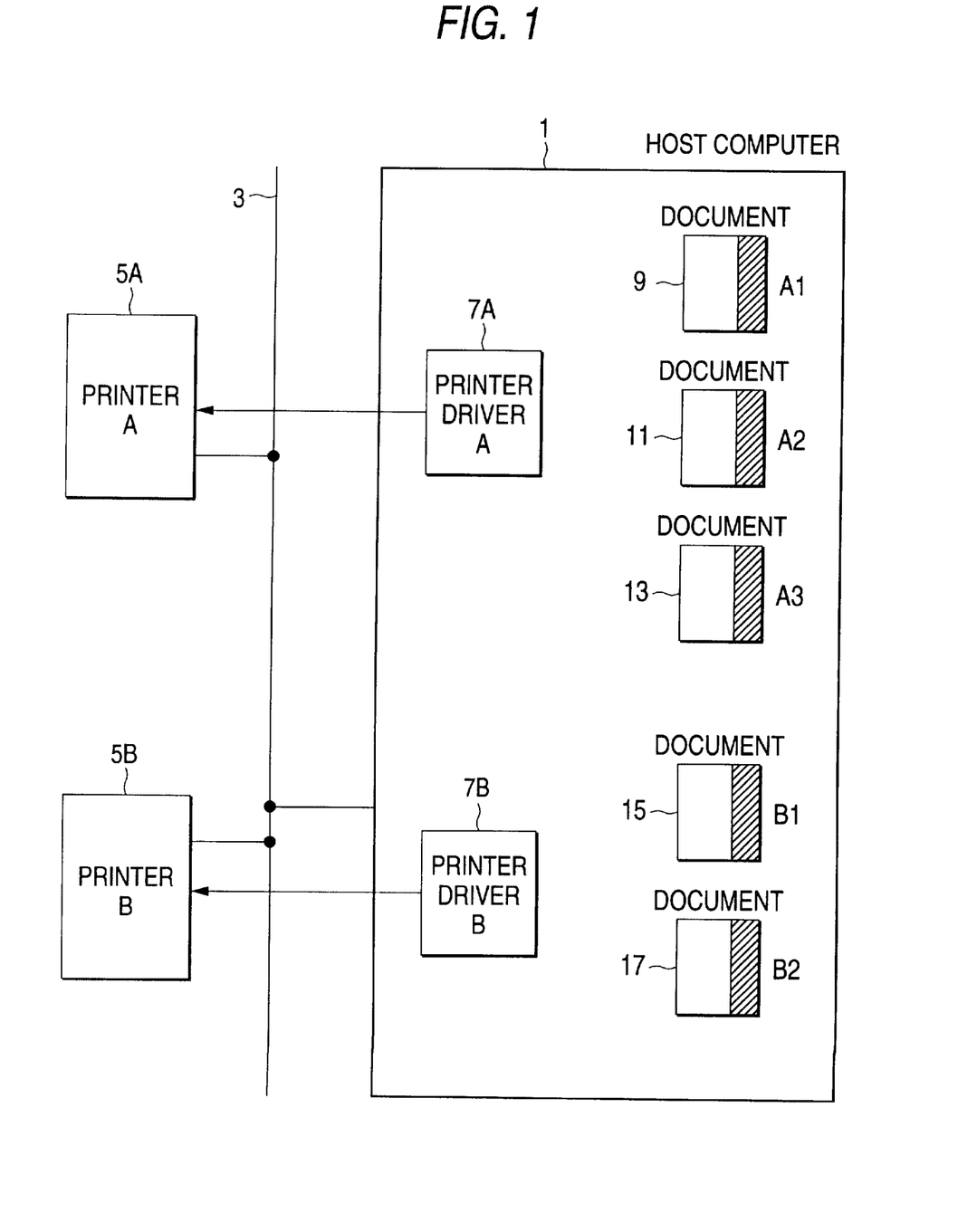
FIG. 1 is a block diagram showing an conventional print system.

FIG. 1 is a block diagram showing an conventional print system.

In an illustrated example, two printers 5A, 5B are connected to a host computer 1 via a network 3. Printer drivers 7A, 7B for use with these printers are installed in the host computer 1. Further, document files 9, 11, and 13 printed by the printer 5A and document files 15, 17 printed by the printer 5B are stored in the host computer 1. The document files 9, 11, and 13 include setting values A1, A2, and A3 determined by the printer driver 7A, and the document files 15, 17 include setting values B1 and B2 determined by the printer driver 7B.

In the conventional print system shown in FIG. 1, each of the document files includes setting values for printing. This means that only the setting values capable of being recognized by the application that has prepared the document file can be stored. For example, even if a printer manufacturer equips his printer with a new function (e.g., a new color conversion table or a new half-toning algorithm) and designs the printer so as to enable a user to set the function through use of a printer driver, the application program fails to understand the setting values for the new function. Hence, the setting values are not stored in the host computer. Accordingly, in order to utilize the new function, the user is required to repeatedly carry out the same setting procedures every time a document is printed, rendering a print operation inconvenient.

Also, for example, with regard to the conventional system shown in FIG. 1, if an attempt is made to print the document file 9, which has been most recently printed by the printer 5A, through use of the printer 5B this time, the setting values A1 appended to the document file 9 cannot be used. For this reason, new setting values must be determined through use of the printer driver 7B. In contrast, even in a case where the document file 9 is printed through use of the same printer 5A, if there is a desire to use the setting values (e.g., setting values A2 appended to the document file 11) used for another document file or to use the setting values employed for printing the same document file 9 in the preceding processes, such setting values cannot be used, and setting values A2 must also be reset. As mentioned previously, if there is a desire to use another printer or another setting value which is the same as that of another document file, the setting value that has been set for another printer or set for another document in the preceding processes cannot be used. Therefore, new setting values must be determined, also imposing an inconvenience on the user.

SUMMARY OF THE INVENTION

Accordingly, the object of the present invention is to enable setting values related to a print mode which have been set on the occasion when a certain document is printed to be used without restraint when various documents are printed in a later time.

Another object of the present invention is to enable setting values related to a print mode that have been determined by a certain person through use of a certain machine to be also used for another person or machine.

First, terms used therein will be slightly explained. In the present invention, to avoid confusion with a "printer driver" which is software, a device capable of activating or controlling a printer, such as a computer capable of executing a printer driver, will be herein referred to as a "printer controller." A typical example of the "printer controller" is a computer equipped with a printer driver. However, the printer controller is not limited to such a computer and may include exclusive hardware having an equivalent or analogous function. As a matter of course, the term "document" used herein includes a text document, in addition, the document represents printable expressions of every description, such as images like photographs or drawings or a combination of images and characters. There are a lot of entries relating to the print mode of an image (e.g., a color conversion table, a half-toning operation, density, a dot gain, a color balance, lightness, or chroma), and the setting value of the entries is troublesome. Therefore, the present invention is thought to be especially effective for printing an image.

To accomplish the foregoing objects, the present invention provides a print system which comprises a printer; a setting device for receiving a setting value specifying a print mode which is entered by a user; a storage device for storing the setting value determined by the setting device; a selector for selecting the setting value selected by the user from the existing setting values stored in the storage device; and a printer controller which processes a document through use of the setting value selected or newly entered by the user to thereby produce print data and which supplies the produced print data to the printer.

In the print system according to the present invention, the setting values used by the printer controller in the past are stored separately from a document. In an attempt to print a new document, the user selects arbitrary setting values from the stored setting values, and the new document can be printed through use of the setting values selected by the user. In this way, the setting values used previously can be used later for printing another new document without being limited by the functions of the application program used for preparing the document. As a matter of course, newly entered setting values may be used in lieu of the stored setting values.

The printer controllers or the printers may store and manage the setting values. Alternatively, in a network environment, a convenient node in the network may store and manage the setting values. In a case where a convenient name (or logical name) is assigned to each of setting values and where a printer or a convenient node in the network collectively manages the setting values, all the members utilizing an identical printer can share the setting values by invoking the setting value by its name, affording convenience to the user. For example, all the members can utilize a setting value most suitable for a portrait (e.g., a color conversion table) or a setting value most suitable for a landscape without restraint, by invoking the setting value using its logical name. It is also possible for all the members to share a highly-sophisticated setting value determined by a specialist.

The names of the stored setting values can be displayed in the form of a list (or a table), enabling the user to readily select a desired setting value. At that time, if the contents of the setting values can also be displayed, or if the titles of the documents that used the setting values in the past, the name of the machine determined the setting value, or the user name who determined the setting value is (or are) displayed together with the setting value, it becomes much easier for the user to select a desired setting value. Further, the printer can be designed in such a way that each of the setting values is displayed in the form of an icon, that the contents of the setting value are displayed with a double-click, and that the document can be printed according to the setting value by dragging and dropping a document icon to the setting icon. Although a typical printer controller is a computer equipped with a printer driver, an operating system or an application program used for preparing a document may have some of the functions of the printer controller according to the present invention in place of the printer driver.

A computer program used for carrying out the present invention in a computer can be installed or loaded into the computer via various mediums such as a disk storage, semiconductor memory, or a communications line.

DETAILED DESCRIPTION OF THE PREFERRED EMBODIMENTS

By reference to the drawings, embodiments of the present invention will be described hereinbelow.

Figure 2:
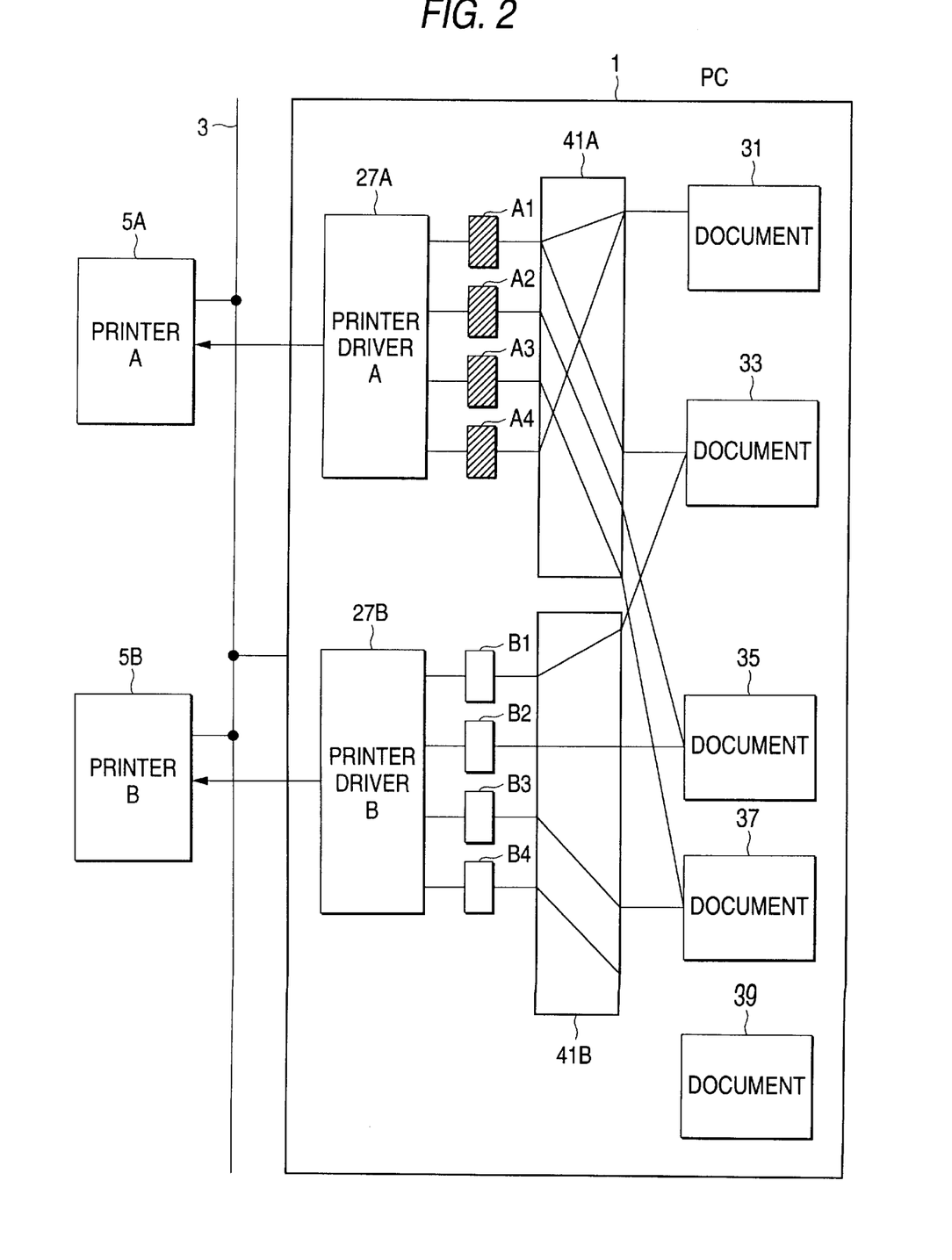
FIG. 2 is a block diagram showing a print system according to the first embodiment of the present invention.

FIG. 2 is a block diagram showing a print system according to one embodiment of the present invention.

As shown in FIG. 2, a plurality of printers, e.g., two printers 5A, 5B, are connected to a host computer 1 via a network 3. Printer drivers 27A, 27B for use with the respective printers 5A, 5B are installed in a convenient storage device of the host computer 1 such as a hard disk. Several document files 31, 33, 35, 37, and 39 are also stored in the same storage device of the host computer 1.

Each of the printer drivers 27A, 27B stores print setting values previously used for any one of the document files. For example, in the case of the example shown in FIG. 2, the printer driver 27A for use with the printer 5A stores setting values A1, A2, A3, and A4 previously used by the printer driver 27A. In contrast, the printer driver 27B for use with the printer 5B stores setting values B1, B2, B3, and B4 previously used by the printer driver 27B. Thus, the print setting values are stored by the printer drivers 27A and 27B independently of the document files. Although the term "previously-used setting value" typically signifies a setting value actually used for printing a document, the term may also indicate a setting value that was determined for the purpose of printing a document but was not actually used for printing.

Further, the printer drivers 27A, 27B store correspondent tables 41A, 41B in which the setting values stored in the printer drivers are arranged so as to correspond to the names (or sets of directory and file name) of document files for which the setting values were used in the past. For example, in the case shown in FIG. 2, the printer driver 27A has used the setting values A1, A4 for the document file 31, the setting value A1 for the document file 33, the setting value A2 for the document file 35, and the setting value A3 for the document file 37, respectively. The correspondence between the setting values and the files is shown in the correspondent table 41A. On the other hand, the printer driver 27B has used the setting value B1 for the document file 33, the setting value B2 for the document file 35, the setting value B3 for the document file 37, and setting value B4 for an unillustrated document having already been deleted from the host computer 1, respectively. The correspondence between the setting values and the files is shown in the correspondent table 41B. A document file 39 in FIG. 2 is not provided in the correspondent table 41A or 41B because the printer driver 27A or 27B has not never been invoked with regard to the document file 39 (i.e., the data relevant to the document file 39 are already deleted from the correspondent tables 41A, 41B by the user).

As mentioned previously, the document files 31, 33, 35, and 37 are arranged so as to logically correspond to the setting values A1, A2, A3, A4, B1, B2, and B3 via the correspondent tables 41A, 41B as indicated by a solid line shown in FIG. 2. For example, the document file 31 is arranged so as to correspond to the setting values A1 and A4, and the document file 33 is arranged so as to correspond to the setting values A1 and B1. The document file 35 is arranged so as to correspond to the setting values A2 and B2. And the document file 37 is arranged so as to correspond to the setting values A3 and B3.

Figure 3:
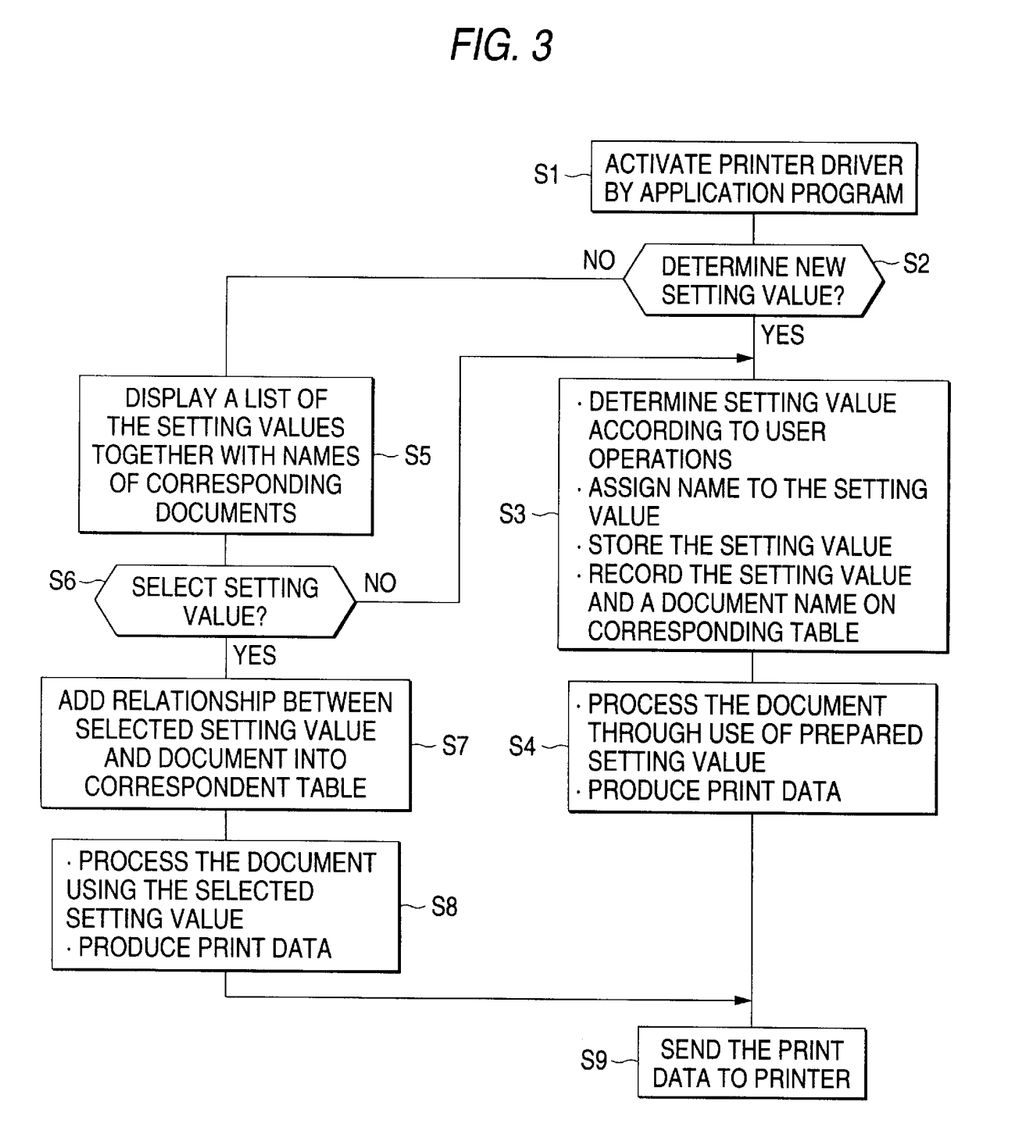
FIG. 3 is a flowchart showing processing operations of a printer driver according to the first embodiment.
Figure 4:
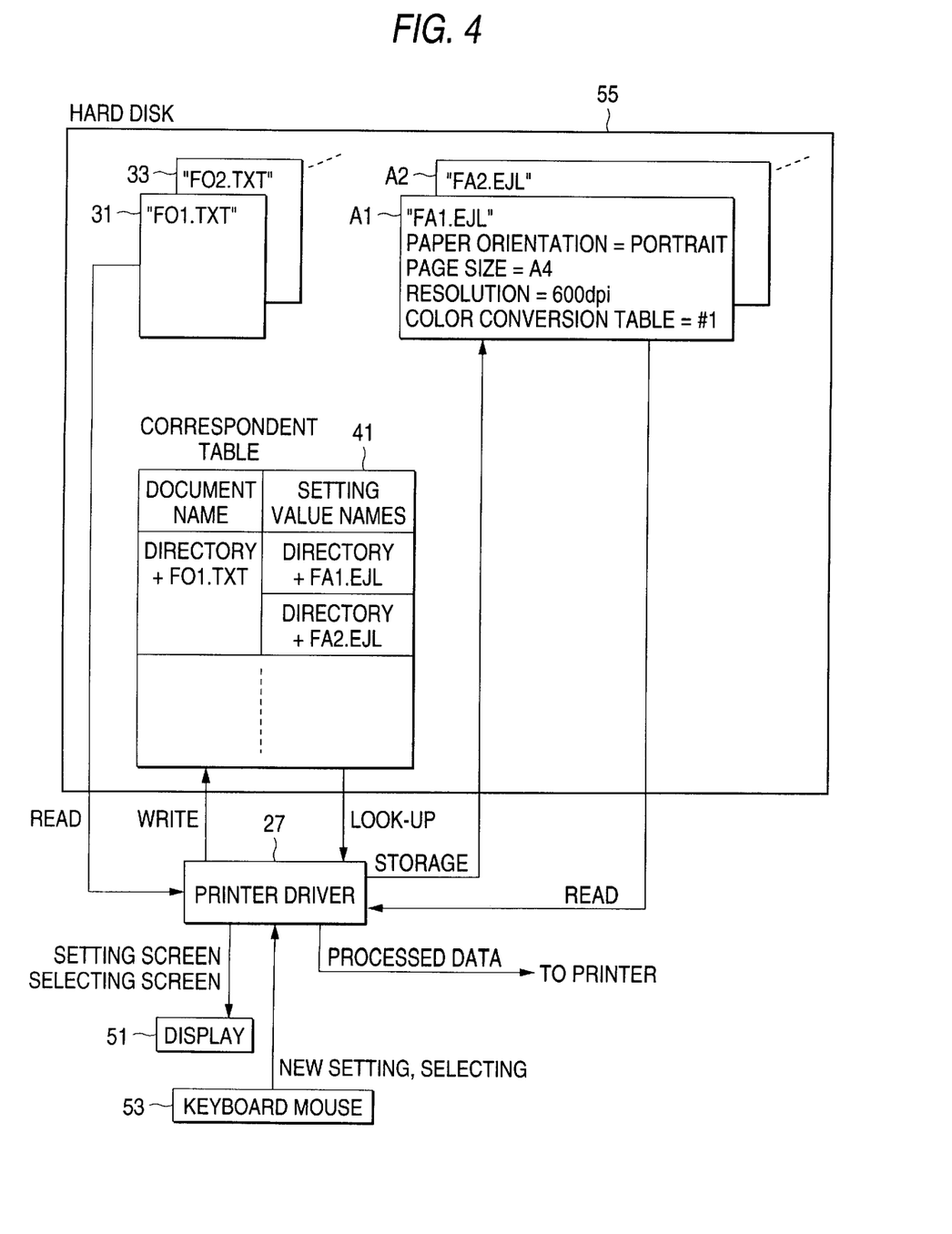
FIG. 4 is a block diagram for explaining an example of the operation of the printer driver according to the first embodiment.

FIG. 3 shows a processing flowchart carried out by the respective printer drivers 27A, 27B. FIG. 4 is a block diagram for explaining operations of the printer drivers. With reference to FIGS. 3 and 4, the processing of the printer driver will be described.

Normally, the printer driver 27 (i.e., 27A or 27B) is initiated by means of an application program at the time of printing of a document file after the application program has prepared the document file (step S1).

First, the printer driver 27 decides whether the user has selected an option for newly determining a setting value or not (step S2). If a setting value is newly determined (Y in step S2), a new setting value is determined according to the operation of a mouse or a keyboard 53 by the user. The newly determined setting value is assigned a name and is stored in a hard disk 55. Further, the name of the setting value (i.e., a directory and a file name) and the name of the document file (i.e., a directory and a file name) are recorded on the correspondent table 41 (41A or 41B) formed in the hard disk 55.

For example, assume that a certain print mode "paper orientation=portrait, page size=A4, resolution=600 dpi, and color conversion table=#1," is determined as a new setting value A1 to print the document file 31, the printer driver 27 stores the new setting value A1 including "paper orientation=portrait, page size=A4, resolution=600 dpi, and color conversion table=#1," in the hard disk 55 under the file name of "FA1.EJL.", as shown in FIG. 4. And a directory and a file name "FO1.TXT" of the document file 31 and a directory and a file name "FA1.EJL" of the setting value A1 are recorded on the correspondent table 41 so as to correspond to each other.

Subsequently, in order to cause the printer to print the document according to the new setting value, the printer driver 27 produces print data by processing the document file prepared by the application program (step S4) and sends the print data to the printer (step S9).

In contrast, if the user does not select a new setting value in step S2 (N in step S2), the contents of the correspondent table 41 are read from the hard disk 55 with a view toward use of existing setting values. A list of names of the document files corresponding to the conventional setting value values registered in the table is indicated on a display 51 (step S5). At this time, a file of setting values is also read from the hard disk 55. The printer driver may be arranged in such a way that when the user specifies a specific setting value on the list through use of a cursor, specific contents of the setting value, e.g., "paper orientation=portrait, page size=A4, resolution=600 dpi, and color conversion table=#1", are displayed.

Subsequently, if the user selects a specific setting value on the setting value list (Y in step S6) and if the thus-selected setting value is not yet arranged so as to correspond to the document file in the correspondent table 41, the printer driver 27 adds information for corresponding the selected setting value to the document file into the correspondent table 41 (step S7). For example, if the user selects the conventional setting value A2 which is arranged so as to correspond to another document file when the document file 31 is printed, an additional entry is made as shown in FIG. 4 so as to link the directory and file name "FO1.TXT" of the document file 31 with the directory and file name "FA2.EJL" of the setting value A2 on the correspondent table 41. Subsequently, in order to cause the printer to print the document file 31 according to the selected setting value A2, the printer driver 27 prepares print data by processing the data regarding the document file 31 received from the application program (step S4), sending the print data to the printer (step S9).

In step S6, if none of the setting values are selected from the setting value list (N in step S6), processing proceeds to the previously-described operations following step S3 in which a new setting value is determined.

Figure 5:
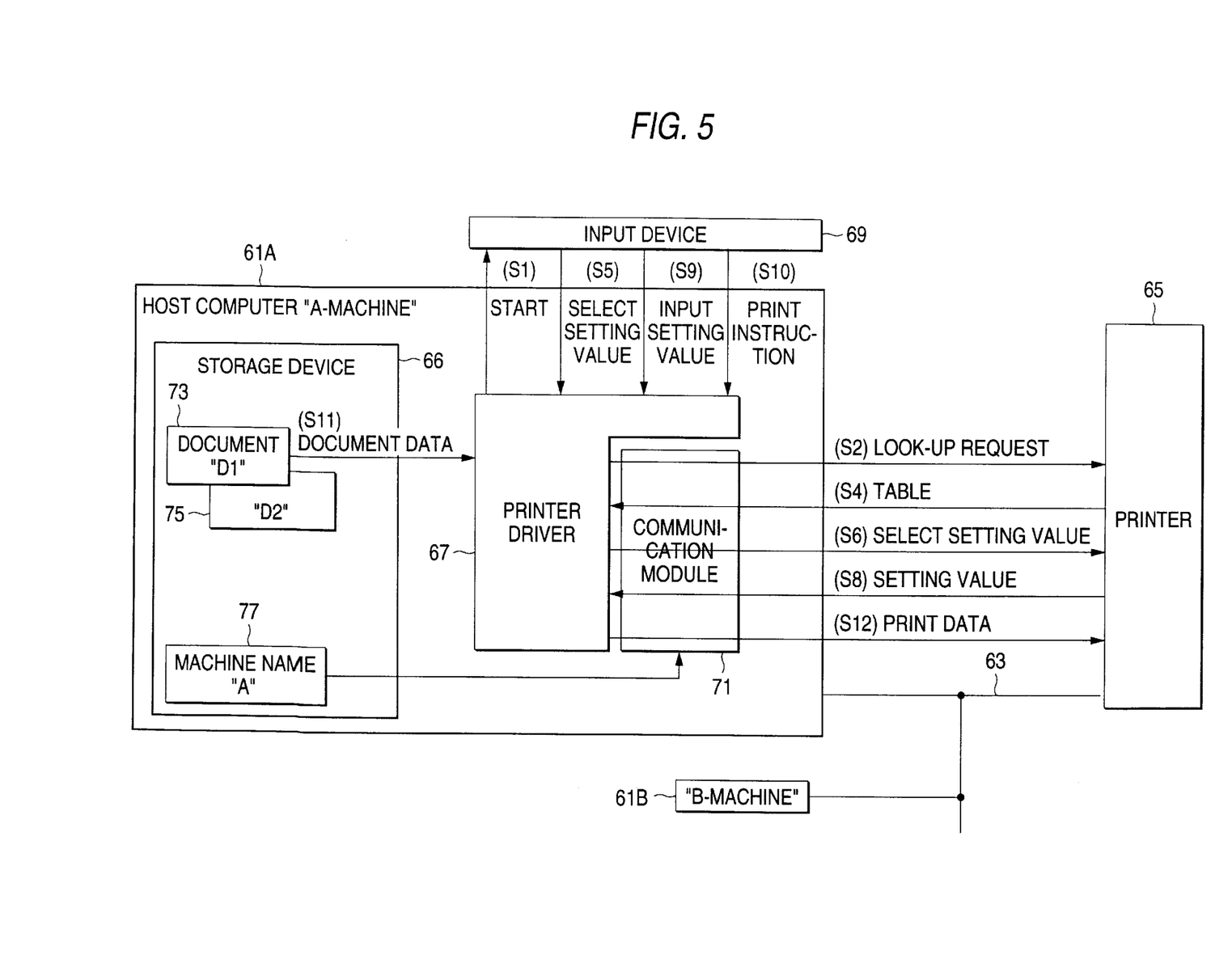
FIG. 5 is a block diagram showing the configuration of a host computer according to the second embodiment of the present invention.
Figure 6:
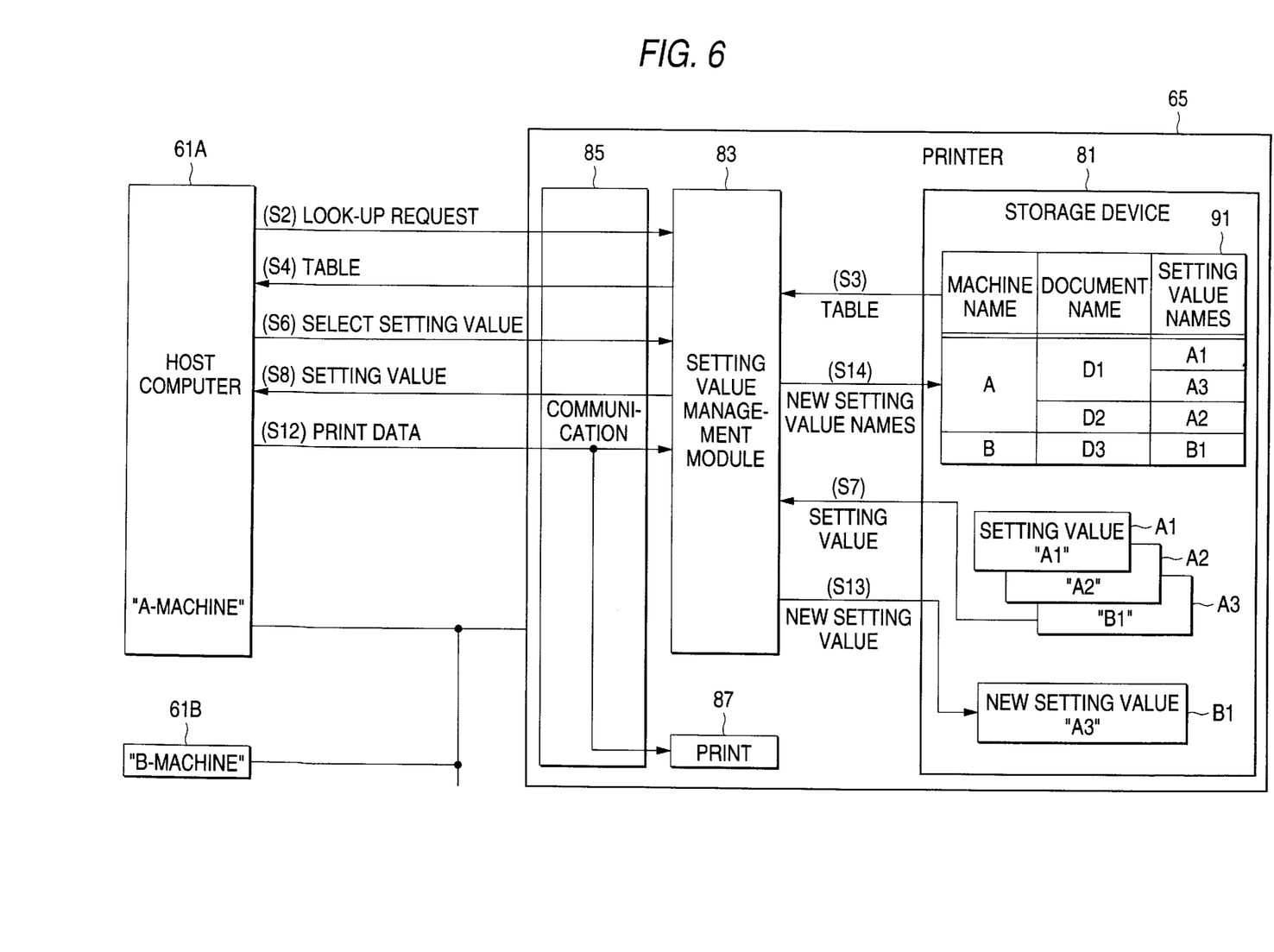
FIG. 6 is a block diagram showing the configuration of a printer according to the second embodiment.

FIGS. 5 and 6 show the second embodiment of the present invention. FIG. 5 shows a configuration of the host computer, and FIG. 6 shows a configuration of the printer in detail respectively.

In this embodiment, a plurality of host computers 61A, 61B are arranged so as to be able to communicate with one printer 65 via a network 63. The printer 65 manages print-mode setting values A1, A2, A3, and B1 which the host computers 61A, 61B specified with respect to the printer 65 in the past. Since the printer 65 is capable of offering the setting values A1, A2, A3, and B1 to the respective host computers 61A, 61B, each of the host computers 61A, 61B can utilize the setting values determined by the other host computer, as well as the setting values determined by the host computer itself. For example, if the user of the B-machine 61B is an expert in photographic printing, the user of the A-machine 61A can also obtain a beautiful photographic print by utilization of the setting value B1 which is determined by the expert so as to become suitable for photographic printing.

As shown in FIG. 5, each host computer, e.g., an A-machine 61A (or a B-machine 61B), is equipped with the printer driver 67 for use with the printer 65 and a communication module 71 for use with the network 63. In a storage device 66 (e.g., a hard disk, RAM, ROM, EEPROM, NVRAM or the like), various types of document files 73, 75 and a machine name 77 of the host computer are stored. As shown in FIG. 6, the printer 65 is equipped with a communication module 85 for use with the network 63, a setting value management module 83 which manages setting values, and a print module 87 which executes a printing operation. On the other hand, in a storage device 81 (e.g., a hard disk, RAM, ROM, EEPROM, NVRAM or the like), a correspondent table 91 which causes a machine name (e.g., an address of the host computer on the network or an indigenous name corresponding to the address), a document name, and the name of a setting value (i.e., a directory and file name) to correspond to one another and various setting value files A1, A2, A3, and B1 are stored.

The operation of the print system according to the second embodiment will be described herein below.

In FIG. 5, for example, assuming that the user of the A-machine 61A initiates the printer driver 67 by means of an input device 69 (e.g., a mouse or keyboard) in order to print a document file 73 assigned the name of "DI" (step S1), the printer driver 67 initially sends a table look-up request signal to the printer 65 by way of the communication module 71. Needless to say, since the communication module 71 appends a machine name "A" 77 to the header of the transmission message signal, the printer 65 which receives the message can identify the origin of the incoming message.

As shown in FIG. 6, when the printer 65 receives the table look-up request signal from the A-machine 61A, the setting value management module 83 reads the contents of the correspondent table 91 (step S3), sending the thus-read contents to the A-machine 61A (step S4). As shown in FIG. 5, according to the contents of the thus-received table, the printer driver 67 of the A-machine 61A prepares a list of setting values in which each setting value is shown so as to be linked with the machine name and the document name, indicating the thus-prepared list on the display (not shown). The user selects a desired setting value, e.g., "B1," from the list of setting values by means of an input device 69 (step S5). The printer driver 67 notifies the printer 65 of the result of user's selection of a setting value (step S6). As shown in FIG. 6, when the printer 65 receives the result for the selection of the setting value, the setting value management module 83 reads a file B1 of the thus-selected setting value "B1" (step S7) and sends the thus-read file to the A-machine 61A (step S8). The printer driver 67 of the A-machine 61A receives the contents of the setting value "B1" as a setting value for the current operation and indicates the thus-received contents on the display.

At the sight of the contents of the-displayed setting value "B1," the user can decide whether the contents of the setting value are acceptable or not. As shown in FIG. 5, if the contents are acceptable, the user enters a print instruction from the input device 69 (step S10). In response to this print instruction, the printer driver 67 receives data of the file 73 regarding a document "D1" to be printed via a display device interface of the operating system (not shown) (step S11). According to the setting value "B1," the printer driver 67 converts the data into print data to be printed by the printer 65 and sends the print data to the printer 65 (step S12). As shown in FIG. 6, upon receipt of the print data, the print module 87 of the printer 65 executes a printing operation.

In contrast, if the user decides that the contents of the selected setting value "B1" are unacceptable, the user can enter a print instruction (step S10) by inputting a new setting value from the input device 69 (step S9). Alternatively, the user may enter a print instruction by inputting a new setting value without selection of a setting value from the list of setting values. In any event, the printer driver 57 prepares print data for the purpose of printing the document "D1" according to the new setting value, sending the thus-prepared print data to the printer 65. As shown in FIG. 6, when the printer 65 receives the print data based on the new setting value, the print module 87 executes a printing operation. Further, the setting value management module 83 assigns the new setting value a new file name, e.g., "A3," and writes the setting value "A3" file A3 into the storage device 81 (step S13). Further, the name of the setting value (i.e., a directory and a file name "A3") is added to a cell of a correspondent table 91 corresponding to the document name "D1" of the machine "A" (step S14).

The embodiments described in the above are merely illustrative of the specific configuration, processing, and functions of the print system according to the embodiments. The present invention is not intended to be limited solely to these embodiments. The present invention can be effected in various forms other than the foregoing embodiments.

There are several available ways of displaying the list of setting values. For example, in the case of the configuration shown in FIG. 2, the most popular way to display the list of setting values is to display a list of available printer drivers 27A, 27B when the user selects "PRINT" from the file menu on a document preparation application program, as well as to display the list of setting values A1, A2, A3, and A4 when the user selects the printer driver 27A from the thus-displayed drivers.

In place of the foregoing embodiment, there is also available an embodiment in which the setting values A1, A2, A3, A4, B1, B2, B3, and B4 are displayed to the view of the user as if they were independent print drivers. For example, when the user selects "PRINT" from the file menu of the application program, a list of virtual printer drivers A1, A2, A3, A4, B1, B2, B3, and B4 is displayed. If the user selects A1 from the list for instance, the printer driver 27A immediately commences a printing operation (a processing operation following Y in step S6 shown in FIG. 3) through use of the setting value A1. Alternatively, the system may be configured such that the actual printer drivers 27A, 27B are also displayed in the list of virtual printer drivers in a manner analogous to that mentioned previously and that when the user specifies the actual printer driver, there is carried out processing for newly determining a setting value on the driver (i.e., processing following Y in step S2 shown in FIG. 3).

It is also possible to configure the print system in such a way that the setting values A1, A2, A3, A4, B1, B2, B3, and B4 are displayed on a graphical user interface in the form of icon like independent printer drivers and that when an icon of document file is dragged and dropped into, e.g., an icon of setting value A1, the printer 27A commences a printing operation through use of the setting value A1. In such a case, another icon may be prepared for the purpose of executing a printing operation by newly determining a new setting value.

The printer driver itself, the operating system, or an application program of the host computer may be provided with the function of displaying the setting values to the sight of user as if they were independent printer drivers.

What is claimed is:

1. A print system comprising:
   a printer;
   a setting device for determining a new setting value specifying a print mode entered by a user;
   a storage device for storing a plurality of previously determined setting values specifying print modes used for previously printed document files and a correspondent table indicating correspondence between the document files and the previously determined setting values;
   a selector for selecting one of the previously determined setting values stored in the storage device in accordance with user instructions; and
   a printer controller for processing a document in accordance with one of the previously determined setting values selected by the selector or the new setting value entered by the user to thereby produce print data which is supplied to the printer.

2. The print system as set forth in claim 1, wherein the storage device is included in the printer controller.

3. The print system as set forth in claim 1, wherein the storage device is included in the printer.

4. The print system as set forth in claim 1 further comprising:
   a communications network,
   wherein at least one of each of the printer, the setting device, the storage device, the selector, and the printer controller are provided on the communications network.

5. A printer controller which produces print data used for printing a document and supplies the prepared print data to a printer comprising:
   setting means for determining a new setting value specifying a print mode entered by a user;
   storage means for storing a plurality of previously determined setting values specifying print modes used for previously printed document files and a correspondent table indicating correspondence between the document files and the previously determined setting values;
   selection means for selecting one of the previously determined setting values stored in the storage means in accordance with user instructions; and
   print data production means for processing a document in accordance with one of the previously determined setting values selected by the selector or the new setting value entered by the user, to thereby produce print data.

6. The printer controller as set forth in claim 5 further comprising:
   an external device capable of communicating with the printer controller,
   wherein the storage means is provided in the external device.

7. The printer controller as set forth in claim 5, wherein the selection means comprises means for displaying the previously determined setting values and the correspondent table.

8. The printer controller as set forth in claim 7, wherein the display means displays the previously determined setting values in the form of independent setting value icons and each of the document files in the form of independent document icons.

9. The printer controller as set forth in claim 8, wherein when the icon of a specific document is dragged and dropped into the icon of a specific setting value, the print data production means processes a document corresponding to the icon of specific document through use of a setting value corresponding to the icon of specific setting value, thereby generating print data.

10. The printer controller as set forth in claim 5 further comprising:

table preparation means for preparing the correspondent table including the correspondence between names of the setting values stored in the storing means and names of the documents that nave been processed through use of the setting values and storing the prepared table in the storing means, wherein the selection means displays a list of documents corresponding to the stored setting values to the user on the basis of the correspondent table and which allows the user to select a setting value from the list.

11. The printer controller as set forth in claim 5 further comprising:

displaying means for indicating contents of the setting value selected by the user.

12. The printer controller as set forth in claim 6, wherein the external device is the printer.

13. The printer controller as set forth in claim 6, wherein the selection means comprises means for displaying the previously determined setting values and the correspondent table.

14. The printer controller as set forth in claim 13, wherein the display means displays the previously determined setting values in the form of independent setting value icons and displays each of the document files in the form of independent document icons.

15. The printer controller as set forth in claim 14, wherein when the icon of a specific document is dragged and dropped into the icon of a specific setting value, the print data production means processes a document corresponding to the icon of specific document through use of a setting value corresponding to the icon of specific setting value, thereby generating print data.

16. The printer controller as set forth in claim 6 further comprising:

table preparation means for preparing the correspondent table including the correspondence between names of the setting values stored in the storing means and names of the documents that have been processed through use of the setting values and storing the prepared table in the storing means, wherein the selection means displays a list of documents corresponding to the stored setting values to the user on the basis of the correspondent table and which allows the user to select a setting value from the list.

17. The printer controller as set forth in claim 6, wherein the external device includes table preparation means for preparing the correspondent table including the correspondence between names of the setting values stored in the storing means and names of the documents that have been processed through use of the setting values, and the selection means displays a list of documents corresponding to the stored setting values to the user on the basis of the correspondent table and which allows the user to select a setting value from the list.

18. The printer controller as set forth in claim 6 further comprising:

displaying means for indicating contents of the setting value selected by the user.

19. The printer controller as set forth in claim 12, wherein the selection means comprises means for displaying the previously determined setting values and the correspondent table.

20. The printer controller as set forth in claim 19, wherein the display means displays the previously determined setting values in the form of independent setting value icons and displays each of the document files in the form of independent document icons.

21. The printer controller as set forth in claim 20, wherein when the icon of a specific document is dragged and dropped into the icon of a specific setting value, the print data production means processes a document corresponding to the icon of specific document through use of a setting value corresponding to the icon of specific setting value, thereby generating print data.

22. The printer controller as set forth in claim 12 further comprising:

table preparation means for preparing a correspondent table including a correspondence between names of the setting values stored in the storing means and names of the documents that have been processed through use of the setting values and storing the prepared table in the storing means, wherein the selection means displays a list of documents corresponding to the stored setting values to the user on the basis of the correspondent table and which allows the user to select a setting value from the list.

23. The printer controller as set forth in claim 12, wherein the printer includes table preparation means for preparing the correspondent table including the correspondence between names of the setting values stored in the storing means and names of the documents that have been processed through use of the setting values, and the selection means displays a list of documents corresponding to the stored setting values to the user on the basis of the correspondent table and which allows the user to select a setting value from the list.

24. The printer controller as set forth in claim 12 further comprising:

displaying means for indicating contents of the setting value selected by the user.

25. A printer control method comprising the steps of:

determining a new setting value specifying a print mode entered by a user;

storing a plurality of previously determined setting values specifying print modes used for previously printed document files and using a correspondent table to indicate correspondence between the document files and the previously determined setting values;

selecting one of the previously determined setting values in accordance with user instructions;

producing print data on the basis of the setting values selected or the new setting value entered by the user; and supplying the produced print data to a printer.

26. A printer for executing a printing operation upon receiving print data from one of a plurality of printer controllers, said printer comprising:

storage means for storing a plurality of previously determined setting values specifying print modes used for previously printed document files, and a correspondent table indicating correspondence between the previously printed document files, the print controllers which provided the previously printed document files and the previously determined setting values; and transmission means for transmitting the previously determined setting values and the correspondent table stored in the storage means to the printer controllers.

27. The printer as set forth in claim 26 further comprising:

table preparation means for preparing the correspondent table including the correspondence between names of the setting values stored in the storing means, names of documents that have been printed through use of the setting values and names of the print controllers which provided print data for the documents, and storing the prepared correspondent table in the storing means.

28. The printer as set forth in claim 26, wherein the setting values specifying the print mode are included in the print data received from the printer controller.

29. The printer as set forth in claim 28 further comprising:

table preparation means for preparing the correspondent table including the correspondence between names of the setting values stored in the storing means, names of documents that have been printed through use of the setting values and names of the print controllers which provided print data for the documents, and storing the prepared correspondent table in the storing means.

* * * * *